May 28, 1968   C. H. SNYDER, JR   3,385,614
MISALIGNABLE FLUID-TIGHT COUPLING
Filed Oct. 14, 1966

INVENTOR.
CLIFFORD H. SNYDER, JR.
BY George Raynovich
HIS ATTORNEY

United States Patent Office 3,385,614
Patented May 28, 1968

3,385,614
MISALIGNABLE FLUID-TIGHT COUPLING
Clifford H. Snyder, Jr., Coraopolis, Pa., assignor to SRM Company, a corporation of Pennsylvania
Filed Oct. 14, 1966, Ser. No. 586,788
1 Claim. (Cl. 285—263)

ABSTRACT OF THE DISCLOSURE

A pipe union type coupling is disclosed in which the end surfaces of the union halves are formed from mating spherical surfaces. The threaded collar of the union also meets one-half of the coupling along mating spherical surfaces and is oversize relative to the housing body. Accordingly, the spherical surfaces with oversize collar permit axial misalignment of the two coupling halves when joining them. The coupling is sealed by the use of a seal ring located with the concave spherical surface of one coupling portion and the collar of the coupling protects the surface containing the seal ring when the coupling is separated.

---

The present invention relates to a misalignable fluid-tight coupling and, more particularly, to a coupling by which two rigid conduits may be connected through a threaded collar even though the conduits are not precisely axially aligned.

In couplings of the type to which the present invention relates, couplings which are also known as unions, a collar rotatably positioned on one portion of the coupling is threaded onto a second portion of the coupling to draw the two coupling portions together in contact with each other.

In couplings of this type, it is practically impossible to start the coupling threadingly together if the two conduits to which the coupling is fixed are not precisely axially aligned. Accordingly, much time and effort is spent in industry in attempting to precisely align conduits so that a pipe union or fluid-tight coupling can be started and threaded together.

Summary of the invention

The present invention is directed to a pipe union type coupling having spherical surfaces to permit connecting of the coupling while misaligned. The invention is particularly directed to an efficient sealing arrangement for such a coupling in which the seal ring which provides the seal between the two coupling halves is located in a groove formed in the annular concave spherical surface of the coupling half over which the coupling collar is disposed. The seal is protected from internal line pressure and is also protected when the coupling is disassembled by the overlying collar.

In the fluid-tight coupling of the present invention, an oversize collar is placed over one portion of the pipe coupling. At the same time, the face on each coupling portion which comes into contact with the other coupling portion is formed of a spherical section so that the spherical faces contact each other even though the coupling is fixed to conduits that are axially misaligned. Further, the bearing surfaces between the oversize collar and the pipe coupling portion with which it is associated are in the form of a spherical surface on both the collar and the coupling portion so that the collar can be axially misaligned with respect to its own coupling portion.

In this way, it has been found that rigid conduits which may be three to five degrees (3° to 5°) or more from being axially aligned can be coupled together with a coupling of the present invention.

The coupling of the present invention contains a seal ring in the face of one coupling portion which contacts the face of the other coupling portion, each coupling portion having the aforesaid spherical surfaces to contact each other so that there is a permissible axial misalignment between the two coupling portions.

With the foregoing considerations in mind, it is an object of the present invention to provide an improved misalignable fluid-tight coupling.

Another object of the present invention is to provide a coupling which has spherical mating surfaces so that axial misalignment between the coupling conduits can occur.

Another object of the present invention is to provide a threaded coupling which can be started and threaded together even though the two coupling halves are not in precise axial alignment.

Another object of the present invention is to provide a threaded coupling with an oversize collar so that the oversize collar will permit starting of the threaded coupling together even though the conduits are axially aligned.

These and other objects of the present invention will become apparent as this description proceeds in conjunction with the accompanying drawing.

Figure 1:
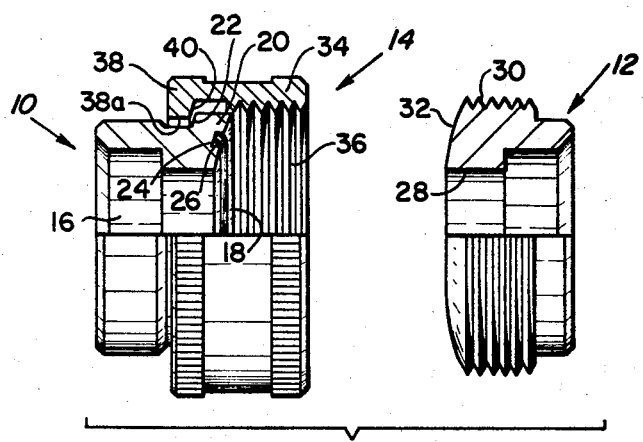
FIGURE 1 is a view, in partial section, of the two halves of the coupling of the present invention in the disassembled condition.

Referring to the drawings, a nipple-receiving member 10, a nipple 12, and a collar 14 comprise the major elements of the coupling of the present invention.

The nipple-receiving member 10 has a generally cylindrical fluid passage 16 formed therethrough. A nipple-engaging annular concave spherical surface 18 on the nipple-receiving member 10 is formed to contact the nipple 12 of the present invention.

Extending radially outwardly from the nipple-receiving member 10 is an annular shoulder 20. The annular shoulder 20 has a convex spherical surface 22 formed thereon which is generally in parallel relationship to the nipple-engaging annular concave spherical surface 18.

The concave spherical surface 18 has an annular groove formed therein approximately midway between the fluid passage 16 and the outer radial limit of the surface 18. An O-ring 26 is disposed within the annular groove 24 to provide a seal ring when the coupling is in the assembled condition.

The nipple 12 has a generally cylindrical fluid passage 28 formed therethrough. On the outside of the body of nipple 12 helical threads 30 are formed. The nipple 12 has an annular convex spherical surface 32 formed on the end thereof. When the coupling is assembled, the annular convex spherical surface 32 abuts and meets with the annular concave spherical surface 18 on nipple-receiving member 10. The spherical sections of surface 18 and of surface 32 are each formed with the same spherical radius.

The coupling collar 14 has a generally cylindrical collar body 34 having helical threads 36 formed on the inner surface thereof. Adjacent one end, an annular inwardly extending shoulder 38 is formed on collar body 34. The inner radial surface 38a of shoulder 38 is of such diameter that the collar 34 fits freely over the nipple-receiving member 10. The shoulder 38 has a spherical concave surface 40 formed thereon in such a manner that the surface 40 can abut the convex spherical surface 22 on shoulder 20 of the nipple 10.

The spherical section of concave surface 40 and the spherical section of convex spherical surface 22 are each formed with the same spherical radius so that they meet with each other in a uniform manner.

Figure 2:
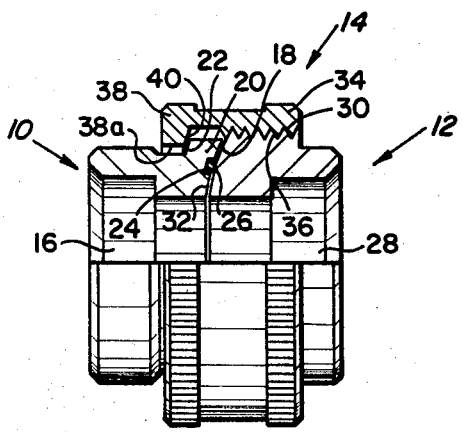
FIGURE 2 is a view, in partial section, of the two halves of the coupling of the present invention in the assembled condition.

As seen in FIGURE 2, when the coupling is assembled, the collar 34 draws the spherical surfaces 18 and 32 on the nipple-receiving member 10 and the nipple 12, respectively, into contact with each other so that the O-ring 26 forms a fluid seal between them.

Because of the spherical surfaces 22 and 40, and the oversize nature of collar 14, the collar may move universally relative to the nipple receiving member 10 so that the collar can draw the nipple 12 into the nipple-receiving member 10 even though the conduits to which nipple-receiving member 10 and nipple 12 are fixed may be axially misaligned.

According to the provisions of the patent statutes, I have explained the principle, preferred construction and mode of operation of my invention and have illustrated and described what I now consider to represent its best embodiment. However, I desire to have it understood that within the scope of the appended claim, the invention may be practiced otherwise than as specifically illustrated and described.

I claim:
1. A misalignable fluid-tight coupling comprising:
   (a) a nipple-receiving generally cylindrical member of relatively short overall length having a cylindrical external surface and having
      (1) a generally cylindrical fluid passage therethrough,
      (2) a nipple engaging annular concave spherical surface formed on the end thereof,
      (3) a resilient O-ring disposed in a groove formed in said annular concave spherical surface radially intermediate the respective inside and outside diameters thereof,
      (4) a radially outwardly extending annular shoulder with a convex spherical surface formed thereon, and
      (5) an annular groove formed in said nipple-receiving member external cylindrical surface to reduce the effective diameter of said external cylindrical surface at the base of said radially outwardly extending shoulder;
   (b) a generally cylindrical nipple of relatively short overall length having
      (1) a generally cylindrical fluid passage therethrough;
      (2) an annular convex spherical surface formed on the end thereof and having substantially the same spherical radius as said nipple engaging annular concave spherical surface, and
      (3) helical thread means formed on the external surface thereof, said helical thread means having a root diameter greater than the maximum diameter of said nipple-receiving member annular shoulder so that said nipple and said nipple-receiving member may assume various lateral positions relative to each other;
   (c) a radially oversize cylindrical collar of relatively short overall length and having thickened end portions positioned over said nipple-receiving member and having
      (1) helical thread means formed on the internal surface thereof to mate with said nipple helical thread means,
      (2) a radially inwardly extending annular shoulder having a minimum diameter substantially greater than the minimum diameter of said annular groove formed in said nipple-receiving member cylindrical external surface so that said collar may move freely laterally relative to said nipple-receiving member, and said shoulder having a concave spherical surface formed thereon, said spherical surface having substantially the same spherical radius as said convex spherical surface formed on said nipple-receiving member annular shoulder,
         said collar shoulder spherical surface and said nipple-receiving member shoulder spherical surface abutting each other when said collar is threaded over said nipple whereby said nipple is drawn axially into contact with said nipple-receiving member even though said nipple and said nipple-receiving member may be axially misaligned; and said collar serving to protect said nipple-receiving member annular concave spherical surface and said O-ring when said coupling is disconnected.

References Cited

UNITED STATES PATENTS

| | | | |
|---|---|---|---|
| 631,064 | 8/1899 | Dart | 285—332.3 X |
| 680,649 | 8/1901 | Crombie | 285—332.1 X |
| 2,523,995 | 9/1950 | Parmesan | 285—332.3 X |
| 3,233,921 | 2/1966 | Holmgren et al. | 285—332.1 X |

FOREIGN PATENTS 627,965   9/1961   Canada.

EDWARD C. ALLEN, *Primary Examiner.*

CARL W. TOMLIN, *Examiner.*

T. F. CALLAGHAN, *Assistant Examiner.*